(12) United States Patent
Daniel

(10) Patent No.: US 7,497,458 B2
(45) Date of Patent: Mar. 3, 2009

(54) POWER RETRACTABLE TRAILER HITCH

(75) Inventor: Joseph Daniel, Northville, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 168 days.

(21) Appl. No.: 11/388,817

(22) Filed: Mar. 24, 2006

(65) Prior Publication Data
US 2007/0222183 A1   Sep. 27, 2007

(51) Int. Cl.
*B60D 1/16* (2006.01)
(52) U.S. Cl. .................. 280/479.1; 280/491.2
(58) Field of Classification Search .......... 280/477, 280/479.1, 478.1, 482, 491.2, 511, 493, 414.1; 114/344
See application file for complete search history.

(56) References Cited

U.S. PATENT DOCUMENTS

| | | | | |
|---|---|---|---|---|
| 2,612,384 A * | 9/1952 | Wiegman | .................. | 280/491.2 |
| 3,428,336 A * | 2/1969 | Thurman | .................... | 280/482 |
| 3,891,239 A * | 6/1975 | Leo et al. | .................. | 280/479.1 |
| 3,989,266 A * | 11/1976 | Foster | .................... | 280/414.1 |
| 4,726,601 A * | 2/1988 | Stevens | .................... | 280/414.1 |
| 4,744,583 A * | 5/1988 | Blackwood | .............. | 280/479.3 |
| 4,746,138 A * | 5/1988 | James | ........................ | 280/487 |
| 5,431,425 A | 7/1995 | Klinkman | | |
| 5,964,475 A * | 10/1999 | Gentner et al. | .............. | 280/420 |
| 6,189,910 B1 | 2/2001 | Bartel | | |
| 6,511,090 B2 | 1/2003 | Quanbeck et al. | | |
| 6,758,485 B1 * | 7/2004 | Voelker et al. | ........... | 280/491.2 |
| 7,185,907 B1 * | 3/2007 | Young | ..................... | 280/491.1 |
| 2004/0075243 A1 | 4/2004 | Reutlinger et al. | | |
| 2005/0161904 A1 | 7/2005 | McJunkin | | |
| 2007/0138760 A1 * | 6/2007 | Granzow | ................. | 280/491.2 |

* cited by examiner

*Primary Examiner*—Anne Marie Boehler
(74) *Attorney, Agent, or Firm*—Young Basile

(57) ABSTRACT

A power retractable trailer hitch for a vehicle can include a hitch assembly movably coupled to an external case or support member, and a power actuator engaging the hitch assembly. The power actuator can be operable to move the hitch assembly between a retracted position and an extended position. A controller can be operable to control activation of the power actuator. An interlock can be provided requiring a transmission of the vehicle to be in a parked position before the controller can be operable to move the hitch assembly between the retracted position and the extended position. A locking member can be operable by the controller to move between a locked position and a released position with respect to the hitch assembly. The locking member can be operable to be in a locked position, when the hitch assembly is in at least one of the extended position and the retracted position, and in a released position, when the hitch assembly is in transition between the extended position and the retracted position.

23 Claims, 3 Drawing Sheets

POWER RETRACTABLE TRAILER HITCH

FIELD OF THE INVENTION

The present invention relates to a power retractable trailer hitch assembly for a vehicle with a power actuator operable to move the trailer hitch assembly between a retracted position and an extended position.

BACKGROUND

Various configurations of manually retractable trailer hitch assemblies can be seen in U.S. Pat. Nos. 6,511,090; 6,189,910; 5,431,425; U.S. Patent Application Publication No. US-2004/0075243; and U.S. Patent Application Publication No. US-2005/0161904. While these devices appear to be suitable for their intended purpose, it would be desirable to provide a power actuator operable to move the hitch assembly between a retracted position and an extended position. It would be desirable to provide a controller operable to control the power actuator. It would be desirable to provide an interlock requiring a transmission of the vehicle to be in a parked position before the controller can be operable to activate the power actuator for controlling movement of the hitch assembly between the retracted position and the extended position. It would be desirable to provide a locking member or pin operable by the controller to be in a locked position when the hitch assembly is in at least one of the extended position and the retracted position, and to be in a released position when the hitch assembly is in transition between the extended position and the retracted position. It would be desirable to provide a user switch having at least a hitch-retract position and a hitch-extend position operable to control the power actuator for controlling movement of the hitch assembly between the retracted position and the extended position. It would be desirable to provide an end-of-travel sensor in communication with the controller and located adjacent at least one end of the support member corresponding to at least one of the retracted position and the extended position of the hitch assembly. It would be desirable to provide any of the features described above in any combination.

SUMMARY

A power retractable trailer hitch assembly for a vehicle according to an embodiment of the present invention can include a support member or external case, a hitch assembly movably coupled to the support member, and a power actuator engaging the hitch assembly. The power actuator can be operable to move the hitch assembly between a retracted position and an extended position.

A power retractable trailer hitch for a vehicle according to an embodiment of the present invention can include a hitch assembly, a power actuator engaging the hitch assembly, and a controller operable to control the power actuator. The power actuator can be operable to move the hitch assembly between a retracted position and an extended position.

A method for controlling a power retractable trailer hitch for a vehicle according to an embodiment of the present invention can include providing a controller operable to control a power actuator, and actuating the power actuator to drive a hitch assembly between an extended position and a retracted position in response to operation of the controller.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
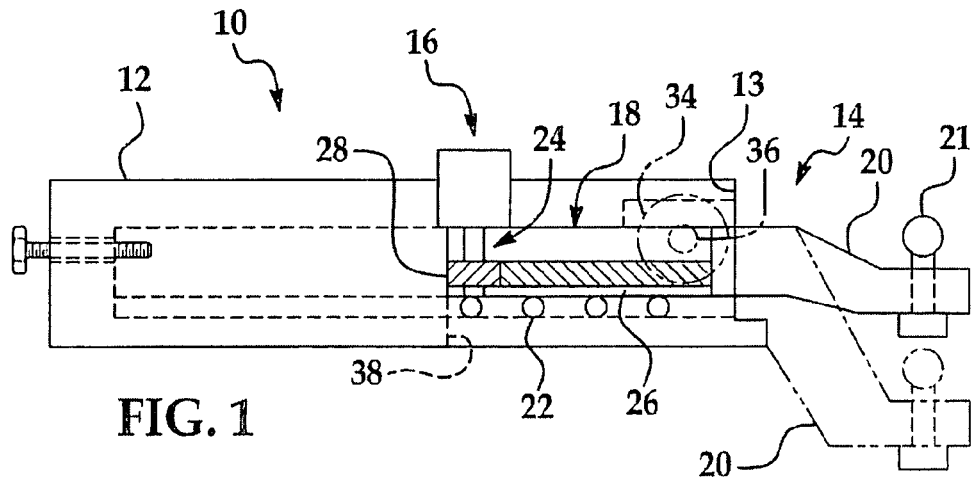
FIG. 1 is a simplified schematic side view of a power retractable trailer hitch according to an embodiment of the present invention in an extended position and illustrates an alternative trailer hitch configuration of lower elevation in dashed line.

Referring now to FIGS. 1-6, a power retractable trailer hitch assembly 10 for a vehicle according to an embodiment of the present invention can include an external case or support member 12 having a rearward edge 13, a hitch assembly 14 movably coupled to the support member 12, and a power actuator 16 engaging the hitch assembly 14. The power actuator 16 can be operable to move the hitch assembly 14 between a retracted position best seen in FIGS. 2 and 5, and an extended position best seen in FIGS. 1 and 4.

The hitch assembly 14 can include a carrier block assembly 18 attachable to a receiver 20 of the hitch assembly 14. A standard hitch ball 21 is provided on the receiver 20. The carrier block assembly 18 can be movably received within the support member 12. A rolling mechanism 22 can be operable to slide the hitch assembly 14 with respect to the support member 12. It should be recognized that any suitable bearing assembly known to those skilled in the art can be used between the hitch assembly 14 and support member 12 in order to allow rolling or sliding movement relative to one another. By way of example and not limitation, the rolling mechanism 22 can include a ball bearing assembly, a cylindrical roller bearing assembly, tapered thrust bearings assembly, sacrificial surface friction bearing assembly, or any combination thereof.

Figure 2:
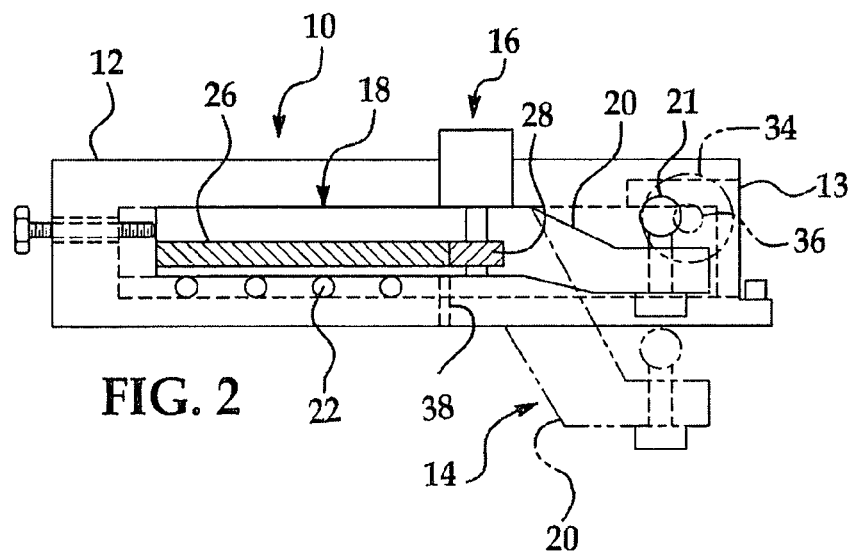
FIG. 2 is a simplified schematic side view of the power retractable trailer hitch illustrated in FIG. 1 in a retracted position and illustrates an alternative trailer hitch configuration of a lower elevation in dashed line.
Figure 3:
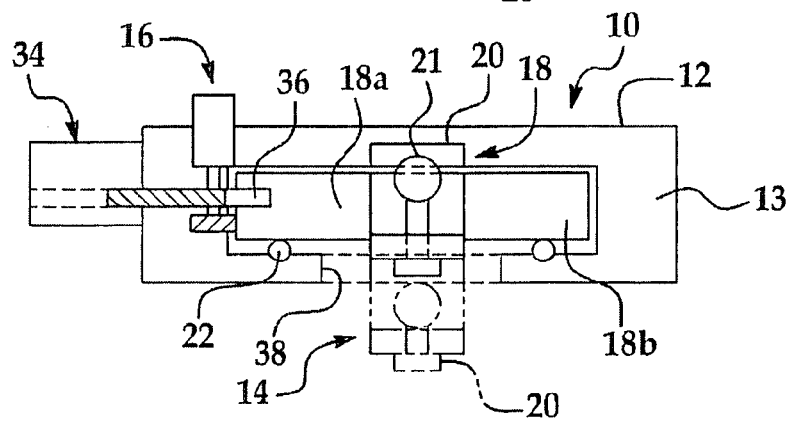
FIG. 3 is a simplified schematic end view of the power retractable trailer hitch of FIGS. 2 and 3.
Figure 4:
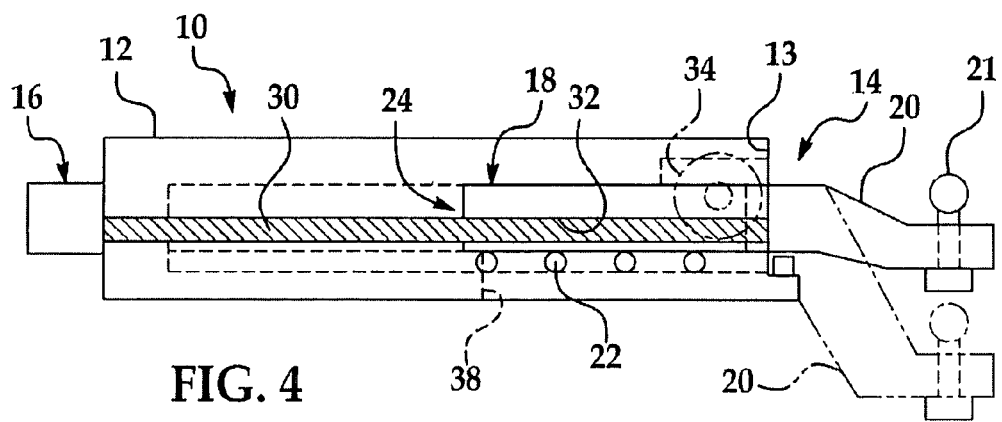
FIG. 4 is a simplified schematic side view of a power retractable trailer hitch according to an embodiment of the present invention in an extended position, and illustrates an alternative trailer hitch configuration of a lower elevation in dashed line.
Figure 5:
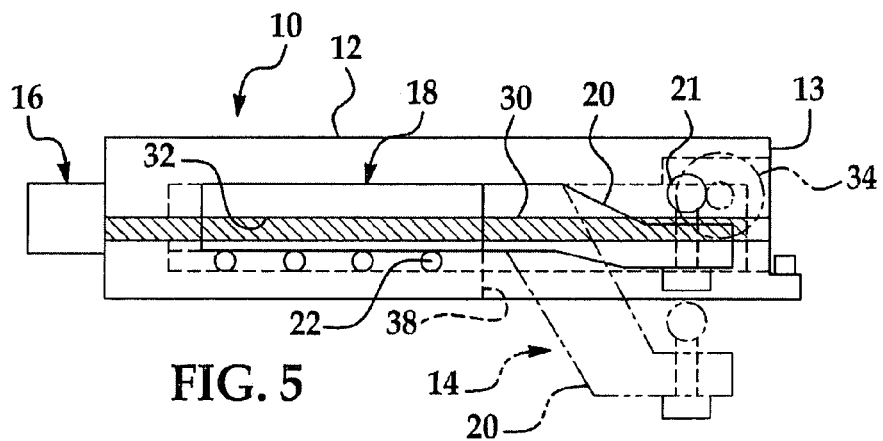
FIG. 5 is a simplified schematic side view of the power retractable trailer hitch of FIG. 4 in a retracted position, and illustrates an alternative trailer hitch configuration of a lower elevation in dashed line.
Figure 6:
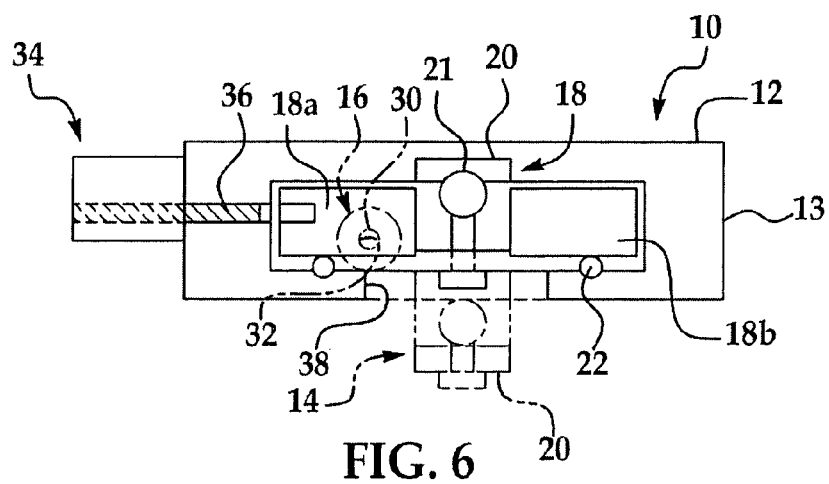
FIG. 6 is a simplified schematic end view of the power retractable trailer hitch of FIGS. 4 and 5.

The power actuator 16 can include a transport mechanism 24 operable to move the hitch assembly 14 with respect to the support member 12. By way of example and not limitation, the transport mechanism 22 can include a rack 26 and pinion 28 combination as illustrated in FIGS. 1-3, or a screw drive 30 and complementary threaded aperture 32 as illustrated in FIGS. 4-6, or any other suitable power driven mechanism.

The power retractable trailer hitch assembly according to an embodiment of the present invention can include a mechanism 34 operable to move a locking pin or member 36 between a locked position and a released position with respect to the hitch assembly 14. The locking member 36 can be operable to be in a locked position when the hitch assembly 14 is in at least one of the extended position as illustrated in either FIG. 1 or FIG. 4, and the retracted position as illustrated in either FIG. 2 or FIG. 5. The locking member 36 can be operable to be in a released position when the hitch assembly 14 is in transition between the extended position and the retracted position. The locking member 36 can be power activated to move between the locked position and the released position.

Figure 7:
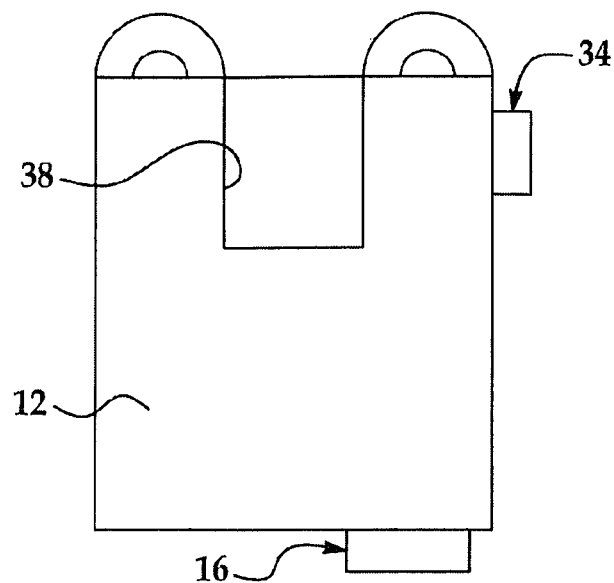
FIG. 7 is a simplified schematic bottom view of the power retractable trailer hitch of FIGS. 4-6.

As best seen in FIG. 7, the support member 12 can include a slot or aperture 38 allowing use of an alternative trailer hitch configuration of a lower elevation as illustrated in dashed line in FIGS. 1-6. The slot or aperture 38 can be seen in hidden lines in the simplified schematic side views of an embodiment of the present invention illustrated in FIGS. 1-6.

Figure 8:
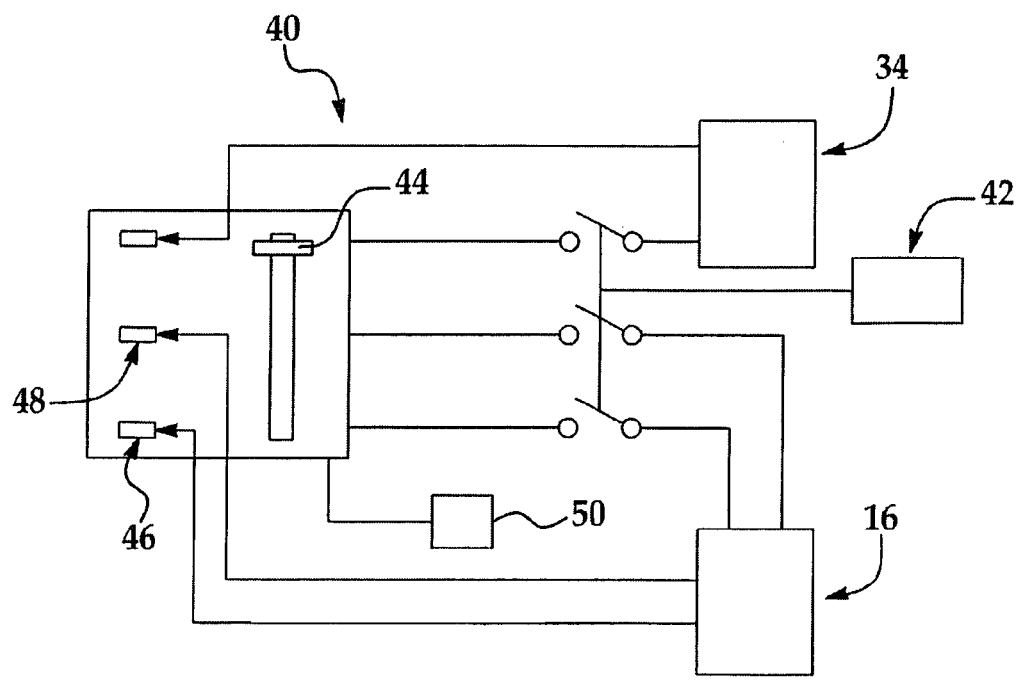
FIG. 8 is a simplified schematic view of a controller according to an embodiment of the present invention illustrating a user switch, a power actuator, a locking member actuator, an end-of-travel sensor, and a vehicle transmission position interlock.

Referring now to FIG. 8, a controller 40 can be operable to control the power actuator 16. An interlock 42 can be provided in order to require a transmission of the vehicle to be in a parked position before the controller 40 can be operated to move the hitch assembly 14 between the retracted position and the extended position. The locking member 36 can be operable by the controller 40 to move between the locked position and the released position with respect to the hitch assembly 14. A user switch 44 can be provided having at least a hitch-retract position 46 and a hitch-extend 48. The user switch 44 can be operable to control movement of the hitch assembly 14 by the power actuator 16. An end-of-travel sensor 50 can be provided adjacent at least one end, or adjacent each end, of the support member corresponding to the retracted position and/or the extended position of the hitch assembly 14. Each end-of-travel sensor 50 can be operably to electrically control the power actuator 16 through the controller 40. An adjustable mechanical stop 52, as best seen in FIGS. 1 and 2, can be located adjacent at least one end of the support member 12 and can be operable to limit travel of the hitch assembly 14 with respect to the support member 12.

A power retractable trailer hitch 10 according to an embodiment of the present invention can include a hitch assembly 14, a power actuator 16 engaging the hitch assembly 14, and a controller 40 operable to control the power actuator 16. The power actuator 16 can be operable to move the hitch assembly 14 between a retracted position as shown in FIGS. 2 and 5, and an extended position as illustrated in FIGS. 1 and 4. The hitch assembly 14 can include a support member 12 having a slot or aperture 38 to accommodate different elevation heights for a receiver 20 of the hitch assembly 14. The hitch assembly 14 can include a carrier block assembly 18 attachable to a receiver 20 of the hitch assembly 14. The carrier block assembly 18 can be movably received within the support member 12. A rolling mechanism 22 can be operable to slide the carrier block assembly 18 with respect to the support member 12. The power actuator 16 can include a transport mechanism 24 operable to move the hitch assembly 14 between the extended position and the retracted position. The transport mechanism 24, by way of example and not limitation, can include a rack 26 and pinion 28 combination as illustrated in FIGS. 1-3, or a screw drive 30 and complementary threaded aperture 32 as illustrated in FIGS. 4-7, or any other suitable power activated mechanism. A mechanism 34 can be operable to move a locking member 36 between a locked position illustrated in FIG. 3 and a released position illustrated in FIG. 6 with respect to the hitch assembly 14. The locking member 36 can be operable to be in a locked position when the hitch assembly is in at least one of the extended position and the retracted position. The locking pin can be operable to be in a released position when the hitch assembly 14 is in transition between the extended position and the retracted position. The locking member 36 can be operable by the controller 40 to move between the locked position and the released position with respect to the hitch assembly 14. An interlock 42 can be provided in order to require a transmission of the vehicle to be in a park position before the controller 40 can be operable to move the hitch assembly 14 between the retracted position and the extended position. An end-of-travel sensor 50 can be provided adjacent to at least one of the retracted position and the extended position of the hitch assembly 14. Each of the at least one end-of-travel sensor 50 can be operable to electrically control the power actuator 16 through the controller 40.

A method or process for controlling a power retractable trailer hitch 10 for a vehicle according to an embodiment of the present invention can include providing a controller 40 operable to control a power actuator 16, and actuating the power actuator 16 to drive a hitch assembly 14 between an extended position and a retracted position in response to operation of the controller 40. The method or process can also include actuating a mechanism 34 operable to drive a locking member 36 between a locked position, when the hitch assembly 14 is in at least one of the extended position and the retracted position, and a released position, when the hitch assembly 14 is in transition between the extended position and the retracted position. The method or process can include providing an interlock 42 requiring a transmission of the vehicle to be in a park position before the controller 40 can be operable to move the hitch assembly 14 between the retracted position and the extended position.

Referring now to FIGS. 1-6, by way of example and not limitation, the Figures illustrate two alternative receiver 20 configurations, one configuration shown in solid line and another configuration shown in dashed line, to illustrate the capability of an embodiment of the present invention to accommodate different elevation heights of receiver 20. According to an embodiment of the present invention, two carrier block portions 18a, 18b can be assembled to either side of a standard receiver 20 to form the carrier block assembly 18. The carrier block portions 18a, 18b can include rolling mechanisms 22 to allow the assembly 18 to slide with respect to the external case or support member 12. The external case or support member 12 can be attached to a vehicle chassis. As illustrated in FIGS. 1-6, the external case or support member 12 can include two transport mechanisms 24, 34. The first transport mechanism 24 moves the carrier block assembly 18 back and forth within the external case or support member 12. The second transport mechanism 34 can move a locking member in and out of engagement with the carrier block assembly 18. The external case or support member 12 can include a slot 38 in a bottom surface to accommodate receivers with varying angles or different elevation heights. A user interface 44 can be provided having a three position switch including a hitch-lock position, a hitch-retract position 46, and a hitch-extend position 48. An adjustable and removable mechanical stop 52 can be provided on at least one end of the external case or support member 12 to limit the travel of the carrier block assembly 18. The locking member 36 can be in the locked position when the carrier block assembly 18 is in the extended position or in the retracted position. The locking member 36 can be in an unlocked or released position when the carrier block assembly is in transition between the extended position to the retracted position in either direction of travel. The movement of the carrier block assembly 18 can be controlled electrically using end-of-travel sensors 50 for the transport mechanism 24. A standard receiver 20 can be modified with additional apertures in order to connect the standard receiver 20 to carrier blocks 18a, 18b, if desired. The locking member 36 can be positioned to use an existing aperture in the standard receiver 20, if desired.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A retractable hitch assembly for connecting a vehicle to a trailer, comprising:
    a support member having a rearward edge;
    a hitch assembly movably coupled to the support member, the hitch assembly having a receiver with a hitch ball, the receiver configured and arranged to be selectively coupled to the trailer;
    a power actuator engaging the hitch assembly, the power actuator operable to move the hitch assembly between a retracted position, wherein the hitch ball is located on a first side of the rearward edge of the support member and an extended position, wherein the hitch ball is located on a second side of the rearward edge of the support member that is opposite the first side of the rearward edge of the support member; and
    an interlock requiring a transmission of the vehicle to be in a park position before the controller is operable to move the hitch assembly between the retracted position and the extended position.

2. The retractable hitch assembly of claim 1, wherein the hitch assembly further comprises:
    a carrier block assembly that is selectively attachable to the receiver of the hitch assembly, the carrier block assembly movably received within the support member.

3. The retractable hitch assembly of claim 1, wherein the power actuator further comprises:
    a transport mechanism operable to move the hitch assembly with respect to the support member.

4. The retractable hitch assembly of claim 1 further comprising:
    a mechanism operable to move a locking member between a locked position and a released position with respect to the hitch assembly.

5. The retractable hitch assembly of claim 1 further comprising:
    a rolling mechanism operable to slide the hitch assembly with respect to the support member.

6. The retractable hitch assembly of claim 1 further comprising:
    a controller operable to control the power actuator.

7. The retractable hitch assembly of claim 6 further comprising:
    a locking member operable by the controller to move between a locked position and a released position with respect to the hitch assembly.

8. The retractable hitch assembly of claim 1 further comprising:
    a user switch having at least a retracted position and an extended position, the user switch operable to control power actuator movement of the hitch assembly.

9. The retractable hitch assembly of claim 1 further comprising:
    an adjustable mechanical stop located adjacent at least one end of the support member operable to limit travel of the hitch assembly with respect to the support member.

10. The retractable hitch assembly of claim 1 further comprising:
    a locking member operable to be in a locked position when the hitch assembly is in at least one of the extended position and the retracted position.

11. The retractable hitch assembly of claim 1 further comprising:
    a locking member operable to be in a released position when the hitch assembly is in transition between the extended position and the retracted position.

12. The retractable hitch assembly of claim 1 further comprising:
    an end-of-travel sensor adjacent each end of the support member corresponding to the retracted position and the extended position of the hitch assembly, each end-of-travel sensor operable to electrically control the power actuator.

13. A retractable hitch assembly for connecting a vehicle to a trailer, comprising:
    a hitch assembly;
    a power actuator engaging the hitch assembly, the power actuator operable to move the hitch assembly between a retracted position, wherein the hitch assembly is prevented from being coupled to the trailer, and an extended position, wherein the hitch assembly is configured and arranged to be coupled to the trailer;
    a controller operable to control the power actuator; and
    an interlock requiring a transmission of the vehicle to be in a park position before the controller is operable to move the hitch assembly between the retracted position and the extended position.

14. The retractable hitch of claim 13, wherein the hitch assembly further comprises:
    a support member including a slot to accommodate different receiver heights of the hitch assembly.

15. The retractable hitch of claim 14, wherein the hitch assembly further comprises:
    a carrier block assembly that is selectively attachable to a receiver of the hitch assembly, the carrier block assembly movably received within the support member.

16. The retractable hitch of claim 15 further comprising:
    a rolling mechanism operable to slide the carrier block assembly with respect to the support member.

17. The retractable hitch of claim 13, wherein the power actuator further comprises:
    a transport mechanism operable to move the hitch assembly between the extended position and the retracted position.

18. The retractable hitch of claim 13 further comprising:
    a mechanism operable to move a locking member between a locked position and a released position with respect to the hitch assembly, the locking member operable to be in a locked position when the hitch assembly is in at least one of the extended position and the retracted position, and to be in a released position when the hitch assembly is in transition between the extended position and the retracted position.

19. The retractable hitch of claim 13 further comprising:

an end-of-travel sensor adjacent at least one of the retracted position and the extended position of the hitch assembly, each of the at least one end-of-travel sensor operable to electrically control the power actuator.

20. A retractable hitch for a vehicle, comprising:

a hitch assembly;

a power actuator engaging the hitch assembly, the power actuator operable to move the hitch assembly between a retracted position and an extended position;

a controller operable to control the power actuator; and an interlock requiring a transmission of the vehicle to be in a park position before the controller is operable to move the hitch assembly between the retracted position and the extended position.

21. The retractable hitch assembly of claim 13 further comprising:

a locking member operable by the controller to move between a locked position and a released position with respect to the hitch assembly.

22. A method for controlling a retractable hitch for connecting a vehicle to a trailer, comprising:

providing a controller operable to control a power actuator;

actuating the power actuator operable to move a hitch assembly between a retracted position, wherein the hitch assembly is prevented from being coupled to the trailer, and a extended position, wherein the hitch assembly is prevented from being coupled to the trailer, in response to operation of the controller; and providing an interlock requiring a transmission of the vehicle to be in a park position before the controller is operable to move the hitch assembly between the retracted position and the extended position.

23. The method of claim 22 further comprising:

actuating a mechanism operable to move a locking member between a locked position when the hitch assembly is in at least one of the extended position and the retracted position, and a released position when the hitch assembly is in transition between the extended position and the retracted position.

* * * * *